United States Patent Office 3,358,201
Patented Dec. 12, 1967

3,358,201
APPARATUS FOR COMPENSATING MACHINE
FEED DRIVE SERVOMECHANISMS
Gordon H. Jones, Fond du Lac, Wis., assignor to Giddings & Lewis Machine Tool Company, Fond du Lac, Wis., a corporation of Wisconsin
Continuation of application Ser. No. 251,371, Jan. 14, 1963. This application July 27, 1966, Ser. No. 568,171
13 Claims. (Cl. 318—18)

ABSTRACT OF THE DISCLOSURE

A machine tool having a feed drive servomechanism including a servomotor for positioning a movable machine element. By means of a main feedback loop a position feedback signal is derived from a point closely coupled to the servomotor and, by means of a correction feedback loop, the position indicated by the feedback signal is compared with the actual position of the movable element. If they differ, the feedback signal is modified to conform more closely to the actual position.

---

This application is a continuation of application Ser. No. 251,371, filed Jan. 14, 1963, and entitled, "Method and Apparatus for Compensating Machine Feed Drive Servomechanisms," and now abandoned.

The present invention relates to improvements in continuous path type positioning control systems for machines, and more particularly to an improved method and apparatus for compensating machine feed drive servomechanisms of such control systems.

These improvements have particular, but not exclusive, utility applied to feed drive servomechanisms of relatively large machine tools wherein massive components are moved through long travels. Such machine feed drive servomechanisms conventionally employ a feedback loop from position indicating transducers to provide an error signal for the servomotor operating the feed drive. Such transducers have been connected effectively to either (1) the output of the servomotor, or (2) to an element of the feed drive dynamically spaced from the servometer and near the component being positioned so as to more accurately indicate its actual position. Where the feedback transducer is connected effectively to the servomotor output, the accuracy obtainable with the servomechanism system has been found to be limited by the accuracy of the feed drive, which has cumulative inaccuracies and variations due to backlash, tooth spacing errors in the power rack gear, lead errors in power leadscrew, wear and other irregularities such as deflections in the elements of the drive.

Where the feedback transducer is coupled effectively to the component being positioned to obtain more accurate indications of the actual position of the component for feedback purposes, the dynamics of the feed drive introduce load resonance effects which are included in the feedback loop. It has been found that such effects tend to limit the band-width of the frequency of mechanical motions which the feed drive is capable of transmitting, and this in turn acts to cause instability of the overall feedback loop.

The major object of this invention is to provide a servomechanism control which will afford greater accuracy in positioning machine components despite feed drive dynamics introducing load resonance and similar effects of a formidable character. It is now proposed to employ feedback from transducers connected effectively to both the servomotor output and the component being positioned, a transducer coupled to the servomotor output being included in a main feedback loop and another transducer being included in a correction feedback loop which adjusts the input to the main feedback transducer to compensate for inaccuracies in the feed drive while maintaining the feed drive dynamically isolated from the operation of the main feedback loop. In this way, the servomechanism control combines the advantages of greater accuracies in positioning obtainable by providing a transducer indication accurately depicting the component position with the advantages of a low compliance, fast-response, close-tracking servo drive obtainable by providing a transducer indication depicting quickly and accurately the position of the servomotor.

It is, accordingly, another important object of the invention to obtain positioning accuracies with feed drive servomechanisms by compensating the feedback arrangement of the servomechanism control for variations in the feed drive.

Another object is to provide a feed drive servomechanism which utilizes a switch-over effect to widen the bandwidth of the mechanical motions which the servomotor is capable of transmitting with stability despite load resonance effects.

Other objects of the invention will be apparent from the following description taken in connection with the accompanying drawings wherein.

Figure 1:
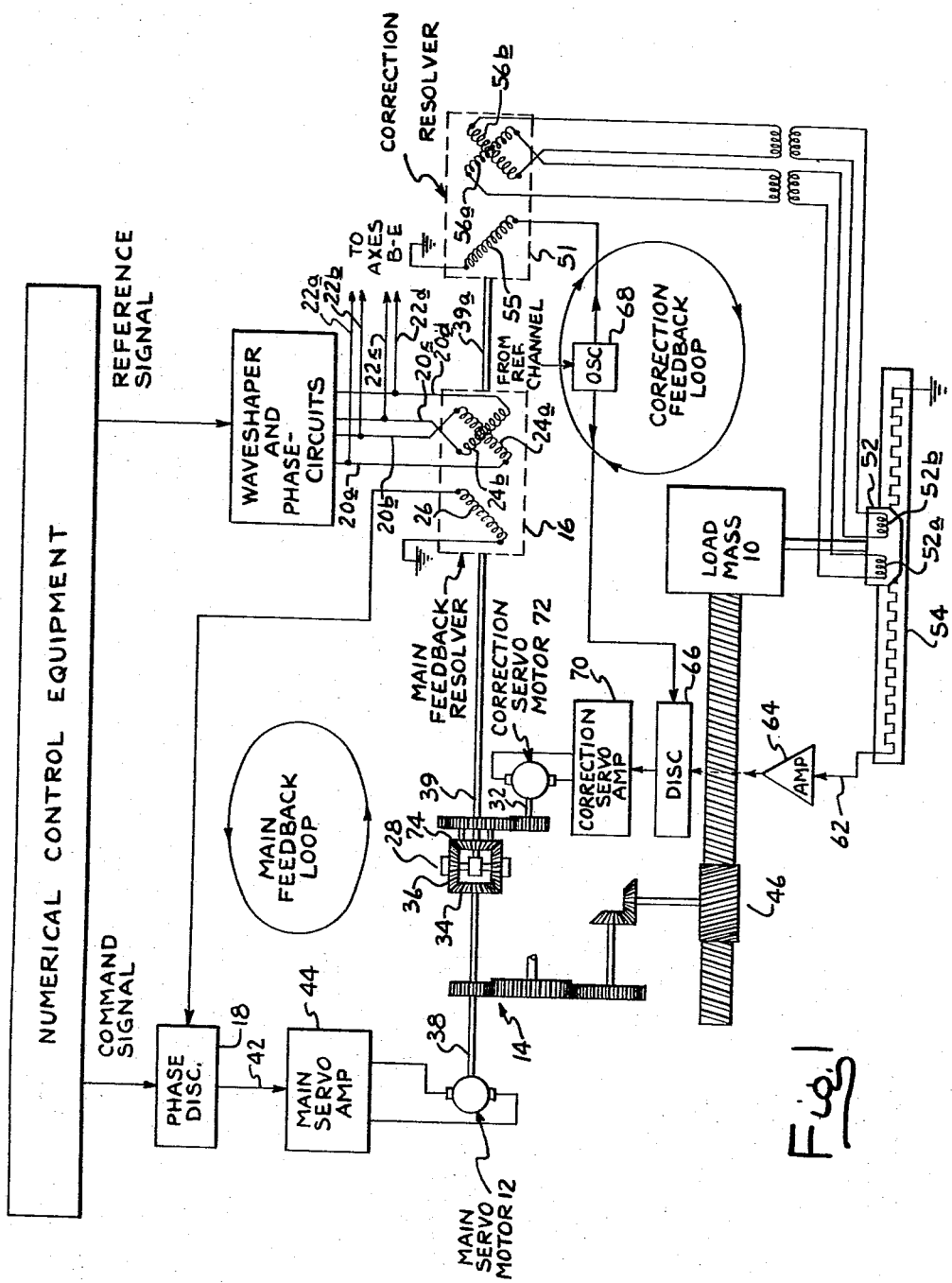
FIGURE 1 is a schematic diagram illustrating a servomechanism control system compensated for feed drive dynamic characteristics.
Figure 3:
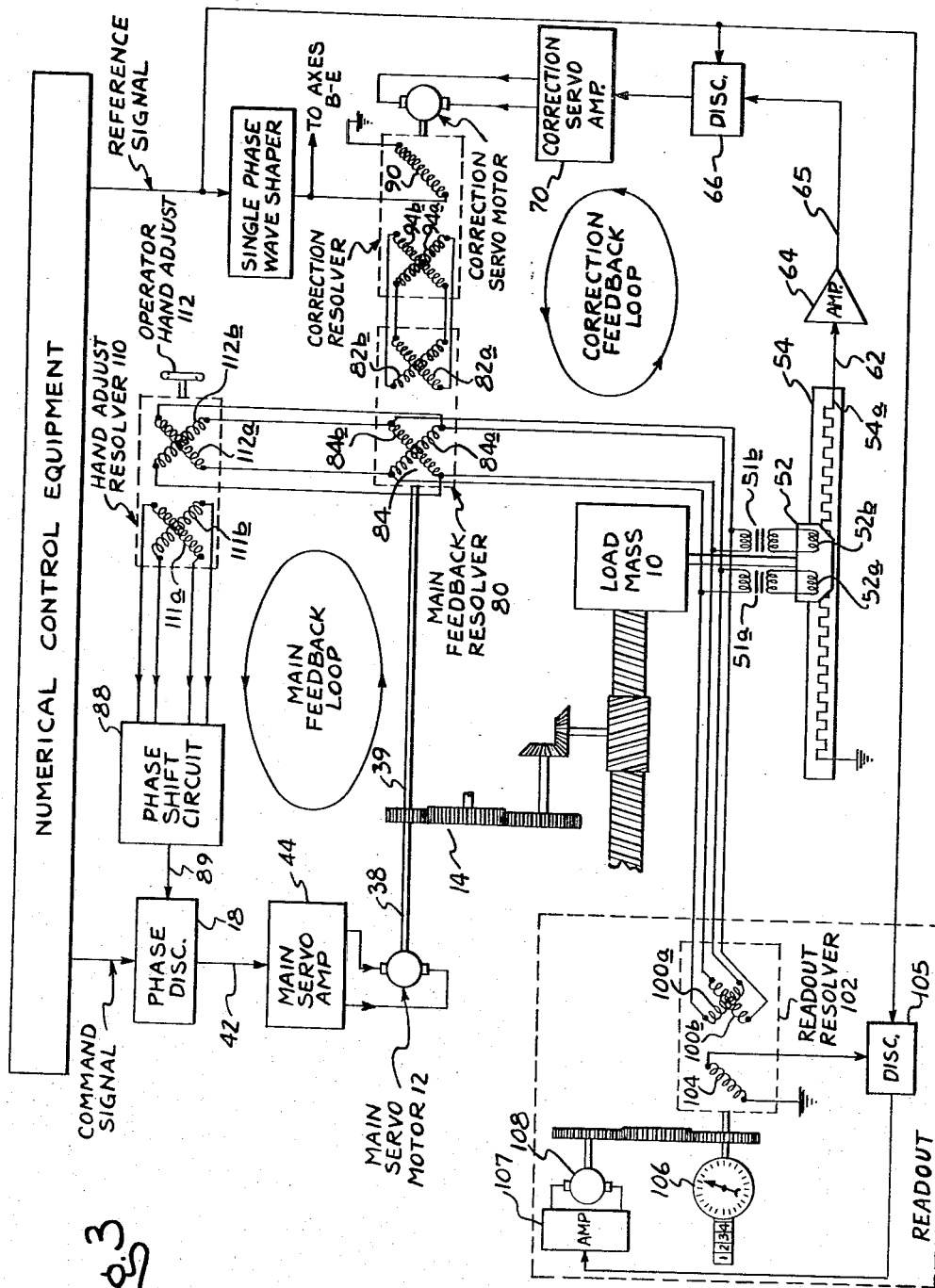

FIG. 3 is a schematic diagram illustrating a modified form of the servomechanism system shown in FIGURE 1 where the correction feedback loop includes a correction servomotor which rotates a differential resolver in cascade with the feedback resolver for compensating the feedback loop for dynamic drive characteristics; and FIG. 4 is a schematic diagram filter and a frequency response curve for such filter.

In brief, the servocontrol includes the servomotor 12 which through a feed drive 14 positions the movable column 10. A main feedback transducer 16, herein shown as a rotary resolver or synchro, produces a signal representing the column position which is conveyed via the main feedback loop to a means 18 for comparing the phase of the feedback and command signals to produce an error signal for driving the servomotor 12. This system typically employs a phase-matching approach; that is, when there is no longer any phase difference between the command and feedback signals the servomotor 12 stops with the column at the command position. Applied to path control, the movable element tracks the command signal.

In somewhat more detail, the reference signal from the numerical control equipment is connected to supply signals in the form of a referenec square wave to the waveshaper and phase-splitter circuits. The waveshaper portion converts the square wave to a high-purity sine wave synchronized to the square wave. The phase-splitter portion "splits" the high-purity sine wave into two sine-wave outputs which are identical in amplitude and 90° apart in time phase, but still are synchronized to the original reference square wave. The two sine-wave outputs are connected via lines 20a through d to the two input windings 24a, 24b of main feedback resolver 16. Inside the resolver 16 the two alternating magnetic fields produced by windings 24a, 24b are combined in space quadrature to produce a constant magnitude, steadily revolving magnetic field synchronized to the original reference square wave.

While the invention has been described in connection with the preferred embodiments thereof, it will be understood that it is not intended to be limited to such embodiments but is intended to include all modifications, alternative constructions and equivalents which are included within the spirit and scope of the appended claims.

Referring now to FIGURE 1, the invention is shown applied to a numerically controlled path system of machine tool control. In the present instance, the block indicated at the top of FIGURE 1 as "numerical control equipment" provides command and reference signals to the servomechanism control system in the lower part of the figure for positioning a movable element such as the movable column 10 of the machine tool illustrated in FIG. 2 along the A axis. While only an A axis control channel is shown in FIGURE 1, it is contemplated similar control channels will be provided for one or more other machine elements along one or more other control axes B–E. Thus, the numerical control equipment may include a recorded magnetic tape played back by means of magnetic play back heads which reproduce reference and command signals previously recorded on the tape. It will be understood, however, that the specifics of the numerical control equipment are not part of the present invention and that the present system is applicable where different types of control equipment are used as will be apparent as the description proceeds.

The same two sine-wave output signals are supplied as indicated at the upper right-hand side of FIGURE 1 to the control channels for the various axes of control, only the A axis control channel being illustrated. As here shown, the two sine-wave output signals are transferred to the stator windings 24a, 24b of the feedback resolver 16. This resolver or synchro device, sometimes called a "resolver control transformer" has a rotor winding 26 in which is induced a single phase alternating voltage of a phase, relative to the excitation applied to the stator windings 24a, 24b, which depends upon the angular position of the rotor 26. As the rotor turns through one complete revolution, the phase of the alternating voltage induced in the winding 26 will smoothly and correspondingly shift through 360°.

As shown schematically by FIGURE 1, the resolver rotor 26 is mechanically connected by means herein shown as a differential gear 28 and the feed drive 14 to be rotated as the controlled machine element, herein the machine column 10, moves. The differential gearing 28 is arranged so that in the absence of rotation of the input shaft 32, the aligned differential gears 34, 36 operate together such that the shaft 39 and the feedback resolver rotor 26 rotates exactly by half the amount that the servomotor shaft 38 rotates to move the column 10 through the feed drive 14. Thus, the phase of the signal induced in the main feedback resolver winding 26 accurately represents by a factor of one-half the angular position of the servomotor shaft 38 at the input to the feed drive, although it will be understood that because of the arrangement of the gearing, the phase of the signal will change 360° for a specific amount of column movement; for example, for each tenth of an inch of movement, the rotor 26 will make one complete revolution. The main feedback resolver signal also represents the position of the column 10 with whatever positioning inaccuracies are present in the feed drive (ignoring the correction servomotor operation). The signal induced in the main feedback resolver rotor 26 is supplied to a phase discriminator 18 which receives, as its other input a command signal herein shown as a phase modulated square wave. The phase modulated command square wave signals received from the numerical control equipment represent by their phase shift the position desired along the A axis for the machine tool column 10.

The phase discriminator 18 thus receives two alternating input signals and in a manner well known to those skilled in the art provides a D.C. error signal on its output line 42 proportional in magnitude to the amount of phase difference between the two input signals and which is of a polarity corresponding to the sense of the phase difference. Thus, if the phase of the two input signals exactly agrees, there will be no error voltage appearing on the output line.

The error voltage appearing on the output line 42 is supplied through a suitable amplifier 44 to the reversible servomotor 12 for positioning the column 10. As here shown, the servomotor 12 drives through the feed drive 14 which includes a rack and pinion 46 for moving the column back and forth along what has been termed here the A axis of the machine tool. The servomotor 12 is here shown as a fast-response variable-speed D.C. motor which runs in one direction or the other according to the polarity of the error signal appearing on the input line and which runs at a speed proportional to the magnitude of that error signal. In this manner, as the phase of the A axis command signal supplied to the phase discriminator 18 progressively shifts relative to the phase of the reference signal from the numerical control equipment, the phase discriminator 18 will provide an error voltage which properly energizes the servomotor 12 to cause the column 10 and the coupled resolver 16 to execute the motions previously represented by numerical information put onto a magnetic tape by the numerical control equipment or some other record storage means. As an error signal appears, and the servomotor moves the column, the rotor 26 of the resolver device is correspondingly rotated to reduce the error signal to zero. In this manner, tracking or servocontrol of the position of the machine tool according to the phase of the A axis command signal is accomplished. The column will move in the directions which have been programmed for each increment of motion, for distances which have been programmed in those corresponding increments, and for periods of time which have been programmed, the column also moving at a rate which is dependent upon the combination of programmed distance and time.

Figure 2:
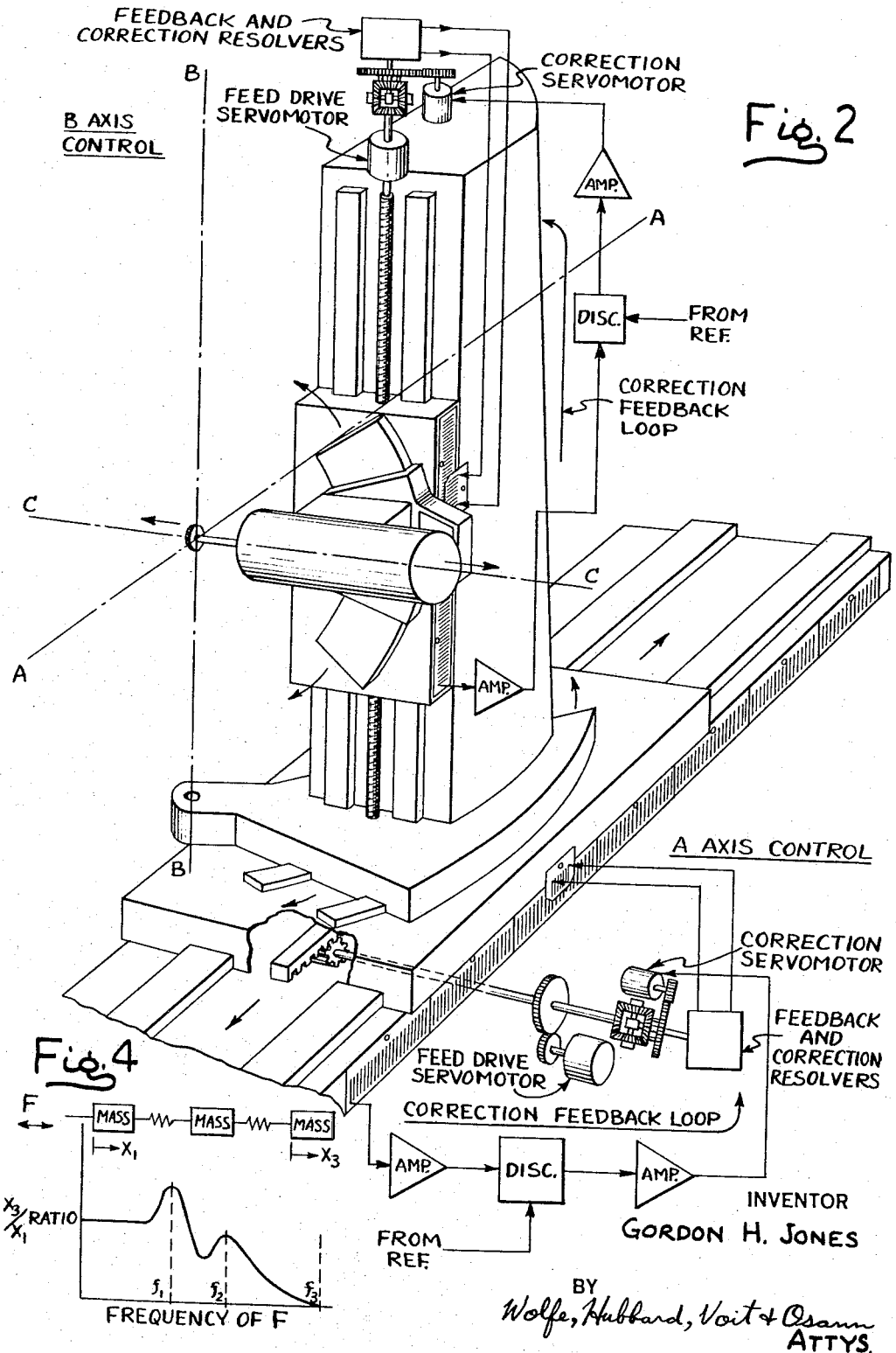
FIG. 2 is an illustration of an exemplary machine tool with Inductosyn scales and sliders employed on the movable column and bed, and on the vertically movable headstock saddle on the column for accurately depicting the position of the column and the saddle respectively.

It will be understood that additional control channels similar to the A axis channel here illustrated are provided for each of the other movable machine tool elements such as the vertically movable saddle which is movable along the B axis, and other elements which have motion along the C, D and E axes of the machine tool (FIG. 2). In this manner, the motion along several axes is properly coordinated and by making each component of movement small and synchronized a complex workpiece may be machined precisely.

In order to accurately position a movable machine element, the column movable along the A axis, for example, by means of the A axis control channel depicted in FIGURE 1, it is absolutely essential to reduce the inaccuracies in the feed drive to as low a point as possible. Even after making the drive as stiff as possible by reducing backlash and deflections to the extent feasible following the most advanced machining and servomechanism practices, it has been found that there are variable factors that introduce substantial inaccuracies in the positioning which may be achieved by use of the servomechanism control system which has just been described. Such variable factors include rack gear pitch errors or rack-and-pinion backlash errors due to limitations in the processes by which such gears are manufactured or due to wear or local temperature changes, deflections in the feed drive members under different cutter force conditions and due to the relatively large forces which must be developed to move a heavy mass such as column 10. Variable factors of the same general nature are likewise found in cases where the feed drive employs a lead screw and nut instead of a rack gear and pinion.

According to the present invention, means are provided for continuously compensating the main feedback loop of the servomechanism control for such inaccuracies in the feed drive. To this end, a correction feedback loop is provided from a transducer 50 located dynamically spaced from the main feedback transducer 16 and as close as possible to the machine element 10 being positioned. In the present case, in a preferred form of the invention, measurement of errors in the feed drive is provided for compensating purposes by utilizing a conventional position measuring transformer, commonly known as an "Inductosyn," excited from the output of a correction feedback transducer herein shown as a resolver 51. Such a transformer for use in the A axis control may comprise two inductively related members 52, 54 movable with respect to each other, one (52) fastened to the column and the other (54) to the bed to provide an output signal which is substantially an amplitude-modulated, phase-reversible sinusoidal wave representing, by the amplitude and phase of the wave, the magnitude and direction, respectively, of the error between the actual position of the column 10 as sensed by transducer 50, and the indicated position of column 10 as sensed by transducers 51 and 16.

As seen in FIGURE 1, one (52) of the relatively movable members of the linear measurement device or Inductosyn 50 employed to accurately measure the position of the movable column relative to the ways on the bed is a slider fixed to the underside of the column and movable lengthwise along the bed relative to the other member (54) of the Inductosyn transformer. The other Inductosyn element (54) in this case is the scale which is fixed on the side of the bed such that an essentially constant clearance spacing is maintained between the slider and the scale when the slider moves relative to the scale as the column moves. The slider 52 has two windings 52a, 52b representing the stator of the device, such windings being in space quadrature; i.e., 90° apart where 360°=0.1 inch linear separation; and excited in the present case from the stator windings 56a, 56b of the correction resolver 51. A separate correction resolver 51 is shown for exciting the Inductosyn slider 52 although it will be observed, and described later in connection with FIG. 3, that with suitable modifications, signals from the main feedback resolver 16 might have been used for exciting the Inductosyn 50, since the rotors of both feedback resolvers (16, 51) as shown are coupled directly together by the shaft section 39a. Using a separate resolver 51 for the correction feedback loop provides a number of advantages; for example, the correction loop may be added to any main servocontrol of a path or tracking control system without redesigning or modifying the components of the main servo feedback loop.

In keeping with the invention, therefore, the output of the Inductosyn scale 54 is a measure of the difference between resolver 51 motion and Inductosyn 50 motion. Whenever such a "difference" is present, it represents inaccuracies resulting from backlash, deflections, etc. in the feed drive 14. Accordingly, this "difference" as represented by the output of the Inductosyn scale 54 is fed back via the correction feedback loop to compensate the main feedback loop. In order to provide the excitation for the Inductosyn 50, the rotor 55 of the correction resolver 51 is excited with a sinusoidal voltage which is here shown as derived from a separate single-phase oscillator 68, in order to retain the advantages of separation between the correction loop and the main feedback loop. Thus, as the rotor 55 of the correction resolver 51 turns as the column is moved by the servomotor 12, sine and cosine voltages are induced in the quadrature windings 56a, 56b of the correction resolver 51, which sine and cosine voltages represent the angular position of the rotor 55 and are conveyed to the linear resolver or Inductosyn 50 located at the machine tool column. In the present case, ignoring for the moment any correction introduced by the correction servomotor, the rotor 55 represents the angular position of the servomotor 12 and of the gearing at the drive end of the feed drive 14 coupled to the movable machine tool element, herein the column 10. The Inductosyn slider 52, it will be noted, accurately represents the position of the machine column. With the Inductosyn slider 52 excited in this way, the output from the scale 54 of Inductosyn 50 is in the form of a signal which represents the difference in position between the correction rotary resolver rotor 55 and the linear Inductosyn slider 52, which difference is attributable to inaccuracies in the feed drive. This difference signal on the output conductor 62 of the linear Inductosyn scale 54 is supplied through an amplifier 64 to a discriminator 66. This discriminator 66 is supplied on its other input with a signal from the single-phase oscillator 68 which is identical in phase to the signal supplied to correction resolver rotor winding 55. Thus, the discriminator 66 of the correction feedback loop produces a D.C. output signal in a manner well known to those skilled in the art which in turn is fed to an amplifier 70 of the correction feedback loop and a correction servomotor 72 which is driven in one direction or the other according to the sense of the signal, tending to correct and align the position of the correction resolver rotor 55 with the actual position of the column represented by the slider 52. To this end, the correction servomotor 72 is connected to the differential gear 28 between the main servomotor 12 and the shafts 39, 39a connecting the main feedback resolver 16 and the correction feedback resolver 51 such that the correction servomotor corrects the shaft input to the main and correction resolvers. The correction servomotor 72 will be driven in a direction tending to reduce the difference signal from the Inductosyn scale 54 to zero. While the correction servomotor 72 through the shaft 32 and differential gears 34, 36, 74 is effective to adjust the shaft input to the correction resolver 51, it is also effective to adjust the input to the main feedback resolver 16 since the rotors 26, 55 of both resolvers 16, 55 are coupled together. In this way, the rotor 26 of the main feedback resolver is rotated to a position accurately representing the actual position of the column 10, and the feedback to the path control system, that is, the main feedback loop, thus supplies a signal to the discriminator 18 of the path control which accounts for the inaccuracies of the feed drive 14. The machine tool column 10 will be accurately moved through the motion called for by the command signal.

One of the features of the present invention is its applicability to path control systems employing conventional resolver-type transducers. Reference may be made to application Serial No. 199,915, filed June 4, 1962, of Arthur O. Fitzner, for a more detailed explanation of an exemplary path system to which the invention may be applied. In an alternative form of the invention, shown in FIG. 3, the path system is seen to contain a main rotary feedback resolver 80 which is directly driven from the output of the main servo drive motor 12. Since there is no correction of the angle of shaft 39 in FIG. 3 for positioning errors in the feed drive 14, the angle of the rotor 84 of the main feedback resolver 80 is not an accurate indication of the position of the column 10. In order to compensate for such positioning errors, a correction resolver 92 is interposed in the input to the main feedback resolver 80 between the single-phase waveshaper of the reference channel and the stator windings 82a, 82b of the resolver 80. This correction resolver 92 functions, in a manner to be more fully described, to so modify the input to the main feedback resolver 80 such that the output signals delivered by its rotor windings 84a, 84b are those sine and cosine voltages which taken together accurately represent the position of the machine tool column 10, notwithstanding the fact that the shaft angle input to the rotor 84 of the main feedback resolver is not an accurate representation of the position of the column 10.

Before explaining more fully the operation of the invention when taken in the form of FIG. 3, the following definitions of the inputs to and outputs of the various resolvers are set forth.

The reference signal supplied by the numerical control equipment is herein taken to be a square wave voltage which is supplied to a single-phase waveshaper and to controls for axes B–E, as may be required. The single-phase waveshaper shapes the reference square wave into a single high-purity sinusoidal voltage wave synchronized to the reference square wave. The high-purity sinusoidal voltage wave is conveyed to the rotor winding 90 of the correction resolver 92, and to axes B–E, as may be required.

As is well known to those skilled in the art, the effect of connecting conventional two-pole stationary-stator resolvers in a cascade string (as illustrated in FIG. 3 by the cascade connection of the correction resolver 92 to the main feedback resolver 80 and to the hand adjust resolver 110) is to produce output voltages from the two output windings of the last resolver in the cascade string that are sine and cosine voltages which taken together represent, to a high degree of accuracy, the algebraic sum of the rotor angles of the various resolvers that have been connected in such cascade string between the single-phase voltage source and the outputs in question. By referring to FIG. 3, it will be seen that in this system a third resolver, herein shown as a hand adjust resolver 110, is connected in cascade with the correction resolver 92 and the main feedback resolver 80. How this hand adjust resolver is employed to manually adjust the position of the column 10 will be described more fully later. It will be noted that the resolvers 92, 80, 110 each have two output windings for separate sine and cosine outputs.

In this cascade string of resolvers, the rotor windings may be the preferred input windings for one type of resolver and the stator windings may be the preferred input windings for another type of resolver. The basic function of the resolver is not changed and therefore no effort has been made in FIG. 3 to consistently assign the input role to the rotor windings, for example.

Further, as is well known to those skilled in the art, the sense with which a given increment of rotor angle is algebraically added may be reversed by appropriate wiring reversals of the wires connected to the rotor or stator windings.

Finally, resolver action in the cascade connection is best described and understood by arbitrarily assigning the sum of the rotor angles to be 0° when the sine and cosine output voltages from the resolver in question electrically represent 0°. The definitions to follow are based on the above arbitrary assignment of 0° and the other related understandings.

The application of the above well-known principles leads to the following definitions in reference to FIG. 3:

(1) The output voltages from windings 94a, 94b of the correction resolver 92 are sine and cosine voltages which taken together represent the algebraic angle of correction resolver rotor 90.

(2) The output voltages from windings 84a, 84b of the main feedback resolver 80 are sine and cosine voltages which taken together represent the algebraic sum of the angles of correction resolver rotor 90 and feedback resolver rotor 84.

(3) The output voltages from windings 111a, 111b of the hand adjust resolver 110 are sine and cosine voltages which taken together represent the algebraic sum of the angles of the rotors 90, 84 and 112 of the three resolvers 92, 80, 110 in the cascade string.

Still referring to FIG. 3, another principle well known to those skilled in the art concerns the conventional two-pole stationary-stator resolver connected as a control transformer, such as the read out resolver 102 of an exemplary read out system for indicating the position of the machine tool column 10. In this type of connection, the output of the resolver rotor (neglecting the slight errors in the resolver itself) is a fundamental null output if the angle of the rotor matches the angle represented by the sine and cosine input voltages. (It is assumed that the sense of the rotor angle has previously been made correct by appropriate wiring connections to the stator windings 100a, 100b, and that the arbitrary assignment of 0° has likewise been made.) The application of this principle leads to an additional definition:

(4) The output of the rotor winding 104 of this read out resolver 102 will be a fundamental null if the actual angle of the rotor matches the equivalent angle represented by the sine and cosine input voltages supplied to the stator windings 100a, 100b.

Further, in keeping with the invention, in the alternative form of the invention of FIG. 3, a correction feedback loop is provided for compensation purposes. As in the case of the principal embodiment of the invention of FIG. 1, the correction feedback loop includes a linear transformer or Inductosyn 50 supplied from a column position indicating resolver via coupling transformers. It will now be shown that the combination shown in FIG. 3 of coupling transformers 51a, 51b, an Inductosyn 50 and an amplifier 64 is effectively a resolver control transformer very much like resolver 102, such that a definition analogous to (4) can be made for this combination.

The Inductosyn 50, comprised of a slider 52 carrying input windings 52a, 52b, and scale 54 carrying output windings 54a, is very similar in its basic operation to the read out resolver 102, performing with linear mechanical inputs in essentially the same fashion as the rotary resolver 102 performs with rotary mechanical inputs. Thus, a linear movement of the movable slider 52 relative to the stationary scale 54 in the amount of 0.1 inch causes one complete cycle of variation of the output signal from the scale winding 54a. In analogous manner, a rotary movement of the read out resolver rotor 104 relative to the stationary stator in the amount of 360° causes one complete cycle of variation of the output signal from the rotor winding 104. Assuming that in both cases the cycle of output variation starts from the fundamental null output condition, the output signal builds up to a maximum A.C. voltage of a certain phase sense relative to the reference signal as the one-quarter point is reached, this being ¼ of 0.1 inch for the Inductosyn 50, corresponding to ¼ of 360° for the read out resolver 102.

As the cycle of variation continues due to assumed additional mechanical input, the output signal drops, reaching another null known as the false or unstable null at the half-way point, this being ½ of 0.1 inch for the Inductosyn 50, corresponding to ½ of 360° for the read out resolver 102.

As the cycle of variation proceeds still further due to assumed further mechanical input, the output signal again builds up to a maximum alternating voltage but of opposite phase sense as the three-quarters point is reached, this being ¾ of 0.1 inch for the Inductosyn 50, corresponding to ¾ of 360° for the read out resolver 102.

Finally, as the cycle of variation is completed by an assumed final mechanical input, the output signal drops down to a fundamental null again. This condition is reached after 0.1 inch of motion for the Inductosyn 50, and 360° of rotor motion for the read out resolver 102.

Having observed the basic similarity of operation between the rotary read out resolver 102 and the linear Inductosyn 50, the functions of the coupling transformers 51a, 51b on the input side of the Inductosyn and the associated amplifier 64 on the output side of the Inductosyn may now be made evident.

Due to manufacturing limitations, it has been found in practice that the impedances of the Inductosyn slider windings 52a, 52b are not identical to the high degree required. Also, these impedances are very low relative to the output impedance rating of the feedback resolver 80, so that if the slider windings 52a, 52b were to be directly connected to the output windings 84a, 84b, the output voltage signals from these output windings 84a, 84b would be very nearly shorted out.

Coupling transformers 51a, 51b effectively raise the impedance level of the input circuits feeding the Inductosyn slider 52 so that excessive load on its windings 84a, 84b is avoided. Coupling transformers 51a, 51b also balance the impedances of the circuits such that the effective input impedance into the primary winding of one coupling transformer 51a is the same as the effective input impedance into the primary winding of the other coupling transformer 51b. The coupling transformers 51a, 51b also balance the output currents being supplied to the slider windings 52a, 52b such that when identical voltages are applied to the primary windings of the coupling transformers, the currents flowing in the slider windings 52a, 52b are identical.

The output signal from the Inductosyn scale 54 is conveyed by a line 62 to the amplifier 64. This output signal has been noted in previous paragraphs similar to the output signal that would be developed by the rotor winding 104 of the read out resolver 102 under the conditions of equivalent mechanical input, where 0.1 inch of linear input for the linear Inductosyn 50 has previously been shown to be equivalent to 360° of rotary input for the read out resolver 102. While the two output signals are in many respects similar under conditions of equivalent mechanical inputs, they differ in that the output voltage signal from the Inductosyn scale 54 is much the weaker of the two by a factor of approximately five orders of magnitude. The two signals also differ in time phase due primarily to the very low ratio of inductive reactance to resistance as found in the Inductosyn input windings 52a, 52b, as contrasted to the high ratio of inductive reactance to resistance as found in the rotary resolver input windings 100a, 100b. The function of the amplifier 64, therefore, is to amplify the output signal from the Inductosyn scale 54 so that the signal conveyed to the correction feedback loop discriminator 66 is substantially the same as that from an equivalent resolver which is sufficiently strong and is of proper phase in relation to the reference signal to provide the desired operation of this discriminator 66. It will be noted, therefore, that the operation of the correction feedback loop discriminator 66 is substantially identical to the read out discriminator 105.

It will be observed, therefore, that the combination of coupling transformers 51a, 51b, an Inductosyn with its slider 52 and scale 54, and an amplifier 64, closely duplicates a conventional rotary resolver connected as a resolver control transformer, such as read out resolver 102, from the standpoint of the electrical input and output signals. The essential difference is that the mechanical input in the case of the Inductosyn is a linear movement, whereas in the case of the read out resolver 102, the mechanical input is a rotary movement. It has also been shown that there is an equivalence insofar as the output effect is concerned between the rotary motion in the case of the rotary resolver and the linear motion in the case of the linear Inductosyn. This equivalence can be summarized by stating that one revolution of the resolver rotor, or proportional part thereof, is equivalent to one increment or like proportional part of relative linear motion between the Inductosyn, slider and scale, producing one cycle of output variations, hereinafter referred to as an "increment cycle." Here it has been taken that the resolver has only a two-pole winding, such that one revolution of the resolver rotor produces only one cycle of output variation. Resolvers with multiple pairs of poles are also available, which produce multiple cycles of output variation for each complete revolution. The teachings of this invention may be extended to cover such alternatives.

It has also been taken here that one increment cycle of the linear Inductosyn is 0.1 inch. Linear Inductosyns have been built using a cycle of other dimensional increments. Further, rotary Inductosyns may be built using a cycle of 1 degree, or 1/100 part of a circle, or other suitable increment cycles. The teachings of this invention are easily extended to cover not only the various increment cycles associated with linear Inductosyns, but also the various increment cycles associated with rotary transducers when the principles of the invention are applied to angular position control.

In particular reference to FIG. 3, however, the sense of equivalence will be observed between the linear motion of the Inductosyn and angular motion of a resolver, or the angular motion represented by the change of sine and cosine voltages derived therefrom.

A definition of the output of the correction feedback loop amplifier 64 can now be made which is analogous to definition (4):

(5) The output of the amplifier 64 will be a fundamental null if the actual linear position of the Inductosyn slider 52 relative to the scale 54 matches the equivalent linear position represented by the sine and cosine input voltages applied to the primary windings of the coupling transformers 51a, 51b, respectively.

Definition (5) can also be reversed, yielding definition (6):

(6) The output of the amplifier 64 will be a fundamental null if the equivalent linear position represented by the sine and cosine input voltages applied to the primary windings of the coupling transformers 51a, 51b, respectively, matches the actual linear position of the Inductosyn slider 52 relative to the scale 54.

On the basis of the last definition (6), it can be seen that if at any time the output of the amplifier 64 is not at fundamental null, then the equivalent linear position represented by the sine and cosine voltages supplied to the primary windings of transformers 51a, 51b, respectively, does not match the actual linear position of the slider 52 relative to the scale 54. Under such conditions, these sine and cosine voltages which are derived from the output windings 84a, 84b of the main feedback resolver 80, do not accurately represent the position of the column 10.

The function of the correction servo is now made evident. The function of the correction servo, comprised of a discriminator 66, the correction servo amplifier 70, and the correction servomotor 72, is to monitor the output of the amplifier 64 for any deviation from the fundamental null output condition. Whenever the amplifier 64 delivers an output signal indicating a departure from the null, such signal indicates that correction of the sine and cosine output voltages from output windings 84a, 84b of the main feedback resolver 80 is necessary. According to definition (2), these output voltages represent the algebraic sum of the angles of the correction resolver rotor 90 and feedback resolver rotor 84. The correction servomotor 72 will run until amplifier 64 again delivers a fundamental null output signal. The correction servomotor 72 thus rotates the correction resolver rotor 90 to correct the sine and cosine output voltages of the main feedback resolver 80. The algebraic sum of the angles of the correction resolver rotor 90 and the feedback resolver rotor 84 has thus been made correct by correcting only the angle of the correction resolver rotor 90.

The operation of the correction feedback loop in producing accurate sine and cosine output voltages from main feedback resolver output windings 84a, 84b is seen to be not critically dependent upon such factors as:

(a) Absolute accuracy of either correction or feedback resolvers.

(b) Signal-to-noise ratio on line 62.

(c) Absolute gain and phase stability and fidelity of amplification of the high-gain amplifier 64.

(d) Absolute constant spacing between Inductosyn and scale.

(e) Amplitude of the output signal from the single-phase waveshaper.

(f) Absolutely correct pitch of the feed drive rack gear.

In the steady-state condition, with all elements at rest, the accuracy with which the sine and cosine output voltages from windings 84a, 84b represent column position 10 is limited only by the accuracy of the Inductosyn and of the coupling transformers 51a, 51b, and by the sensitivity of the correction servo apparatus; i.e., upon its ability to develop breakaway torque of the correction servomotor 72 when an extremely small deviation from the fundamental null output condition of amplifier 64 occurs.

In the dynamic condition, with the main servomotor 12 running and column 10 in motion, the accuracy with which the sine and cosine output voltages from windings 84a, 84b represent column position is not only dependent upon the factors mentioned previously, but in addition is highly dependent upon the rate at which errors in this representation are being introduced by the feed gearing 14, and upon the rate at which the error can be corrected by the correction servomotor 72. To achieve the highest accuracy under dynamic conditions, it would appear from the above statements that the correction rate developed by the servomotor 72 in rotating the correction rotor 90 to produce said correction should be as high as possible. Subsequent paragraphs relating to servo stability considerations of the main feedback loop will bring out reasons for placing limits upon the correction rate.

An important feature of the present invention lies in the use of the linear Inductosyn to produce an output which is a measure of the difference between the position of column 10 as represented by the sine and cosine outputs from windings 84a, 84b of the main feedback resolver 80 and the position of the column 10 as measured by the Inductosyn. When other devices are used for the main feedback, such as a rotary quantizer, which produces an electrical feedback pulse of positive sense for each small positive rotary increment, and an electrical feedback pulse of negative sense for each small negative rotary increment, the position difference intelligence may be obtained by comparing the aforementioned pulses with a similar series of pulses derived from a linear quantizer device measuring actual position of the column 10 by means of a linear grating and photocell-pickup. When the difference has been obtained, the difference may be reduced to zero at a controlled rate substantially proportional to the magnitude of the difference by introducing via digital means an added series of correction pulses into the output of the rotary quantizer. It will thus be seen that a further important feature of the invention is its applicability to systems using other transducers than an Inductosyn coupled as shown in FIGS. 1 and 3 to rotary resolvers for determining the difference between the position as sensed by the main servomotor and its actual position.

Means are also provided with the present invention which allows the operator to manually adjust the machine tool while it is in operation. The operator can by means of a hand adjust resolver 110 in the main feedback loop offset the tool to take a heavier or a lighter cut, for example. How this is achieved will be seen by reference to FIGURE 1 which shows a hand wheel 112 for rotating manually the resolver rotor 110. The stator windings 114a, 114b of this resolver 110 are excited from the feedback resolver stator windings 82a, 82b and thus receive corrected sine and cosine voltages accurately representing the actual position of the machine tool element being controlled, such as the machine column 10.

Referring to definition (2) and definition (3), the operation of the hand adjust resolver 110 is made evident. This resolver 110 accepts the sine and cosine voltages supplied from the output windings 84a, 84b of the main feedback resolver 80, which voltages taken together represent an angle equivalent to a linear position of column 10. The hand adjust resolver 110 operates upon these voltages such that its output is a set of sine cosine voltages, which taken together, represent the alegbraic sum of the aforesaid column position representing angle, and the angle of hand adjust resolver rotor 112. Accordingly, the output of the hand adjust resolver 110 represents the linear position of column 10, to which a linear position offset, proportional to the angle of the hand adjust resolver 112, has been algebraically added.

Since the hand adjust resolver 110 is included in the main feedback loop, the sine and cosine output voltages from windings 111a, 111b of this resolver 110 are supplied as inputs to a phase shift circuit 88, which preferably is of the type described in the above-noted application Serial No. 199,915.

The phase shift circuit 88 effectively combines the sine and cosine output voltages in time quadrature, to produce a single sinusoidal wave of substantially constant amplitude but shifted in phase relative to the reference signal by an amount proportional to the linear position of the column 10 plus the linear offset effect produced by the hand adjust resolver 110.

Temperature variations of the various resolver windings may cause a small but erroneous time phase shift of the signals supplied to phase shift circuit 88, which will show up as a slight phase shift error of the phase-shifted output signal from phase shift circuit 88. Various methods well known to those skilled in the art may be used to hold this error to acceptable levels.

It is believed that a summary of the operation of the main servo system will be helpful to a complete understanding of the invention. The command signal from the numerical control equipment is herein taken to be a phase-shifted square wave voltage representing by its phase relative to the phase of the reference signal the desired position of column 10. This signal is supplied as one input to the phase discriminator 18.

Ignoring at this point any offset introduced by the hand adjust resolver 110, the output signal from the phase shift circuit 88 of the main feedback loop is a phase-shifted sine wave of voltage representing by its phase relative to the phase of the reference signal the actual position of column 10, to the degree that such actual position can be measured and converted into electrical signals by the main feedback resolver and the correction feedback loop.

The operation of the servo, including the phase discriminator 18, main servo amplifier 44, and main servomotor 12 is to move the main feedback resolver 80 and the column 10 to cause a matching of the phase of the two signals supplied to the discriminator 18.

Now when the rotor 112 of the hand adjust resolver is moved to a different position, a shift in the phase of the signal conveyed on line 89 occurs. Since the two inputs to discriminator 18 no longer match in phase, the main servo apparatus immediately reacts to reposition the main feedback resolver 80 and the column 10 to reestablish the matching. The operator hand adjust resolver 112 is therefore a manual offset means on each and every commanded position as represented by the command signal.

The operation of the position read out system may be summarized by first recalling that the sine and cosine outputs from output windings 84a, 84b of the main feedback resolver when taken together represent the actual position of column 10 to an accuracy limited only by the inherent capabilities of the Inductosyn equipment and the correction servo apparatus. Therefore, these sine and cosine output signals are a sufficiently accurate measure of the position of column 10 to be used as the input to a position read out unit as illustrated in FIG. 3.

Referring to definition (4), the output of the rotor 104 will be a fundamental null only if the angle of the rotor, indicated by read out dial-and-counter 106, matches the equivalent input angle represented by the sine and cosine voltages supplied to stator windings 100a, 100b. The read out servomotor 108 will be caused to run by discriminator 105 and amplifier 107 until the fundamental null output from winding 104 is obtained. The readings produced in the dial-and-counter 106, being an accurate indication of the read out resolver rotor 104 angle, therefore will be an accurate indication of the equivalent input angle represented by the sine and cosine inputs supplied to its stator windings 100a, 100b, which equivalent input angle is in turn a highly accurate measure of the position of the machine tool column 10.

Because of the above relationship, the position read out will indicate all movements of the column 10, whether commanded by the numerical control equipment or manually commanded by the operator by adjustment of the hand adjust resolver 112.

Further, in keeping with the invention, a zero-offset type of adjustment may be added to the described read out unit. A manual rotary input to the stator windings of the read out resolver 102, or the addition of another resolver in cascade with and immediately preceding the read out resolver 102 will provide zero-offset adjustment.

Referring now to the correction servo apparatus, it was previously noted that the correction rate of the correction servomotor should be as high as possible. Other factors are also entailed in obtaining a controlled correction rate. With reference to the system of FIG. 3 for controlling a large massive machine tool, the feed drive 14 functions to convert rotary movements of the main servomotor 12 to linear movements of the column 10. When load masses become very large, as in such a case, the force required to produce a given acceleration of the load mass also becomes very large. A feed drive which is entirely adequate for normal running of a machine tool component may not have the response necessary to convert a sudden small movement of the motor into a simultaneous sudden small movement of the load. The feed drive and load therefore constitute a "mechanical filter" inserted between an input quantity and an output quantity. The input quantity is the angular position of the motor and the output quantity is the linear position of the load.

Another of the features of the present invention, applicable in either form as shown in FIG. 1 or FIG. 3, is its ability to obtain higher accuracies in element positioning over wider band-widths of cyclical variations in mechanical motions transmitted through the feed drive to the driven element. Due to load resonance effects, attempts to employ a servomechanism with feedback of position indicating signals directly from the driven machine element as by means of an Inductosyn have resulted in systems operable only at low frequencies of mechanical motion, for example, up to three cycles per second for a large massive component such as the machine tool column as depicted in FIG. 2. At higher frequencies, for example at about ten cycles per second, the system becomes unstable due to load resonance effects.

With the present invention, however, where the output from the machine element connected transducer 50 is employed through the correction feedback loop to continuously compensate or adjust the input to the main feedback resolver, it is believed that a switch-over effect is produced by which the point of feedback takeoff is switched from the machine element to the main servomotor output as a function of frequency of mechanical motions transmitted through the feed drive. For low frequencies up to the "switch-over" frequency, which may be about three cycles per second in the servo drive for a machine tool column as depicted in FIG. 2, the feed drive with its backlash, windup, resonance, etc. is included in the main servo feedback loop. For higher frequencies up to perhaps a band-width limit above ten cycles per second, the feed drive is outside the main servo feedback loop. In this manner, the dynamics of the feed drive are outside the main servo feedback loop for frequencies where load resonance effects may introduce instability while retaining the accuracy of positioning demanded of high performance machine tool servocontrol systems.

Such load resonance effects may be briefly explained without developing extreme details of servomechanism theory and by further simplifying the explanation by neglecting non-linearities such as backlash and stiction effects entirely. The above mentioned mechanical filter could, as schematically illustrated in FIG. 4, be considered to be a number of separate masses connected in series fashion by a compliance, or spring, between each pair of neighboring masses. It is assumed that a frequency resonse curve of such a series of springs and masses, in terms of input and output linear movements, as shown in FIG. 4, will have one or more frequencies of resonance, $F_1$, $F_2$, and also will have some frequency $F_3$, which is called the cut-off frequency of the mechanical filter. In the vicinity of a resonance frequency or the cut-off frequency, the phase shift characteristic of the filter is likely to show a rapid change of phase shift for a small change of frequency.

If such a mechanical filter is present in the main feedback loop as shown in FIG. 3, the band-width of the main feedback loop will be limited to that band of frequencies which both the servomotor apparatus and the mechanical filter can transmit without developing a total phase shift around the loop sufficient to cause a positive feedback oscillation. Since the element least able to transmit a wide band of frequencies is in many cases the mechanical filter (the feed drive in the case of the machine tool), this element becomes the limiting factor on the attainable band-width.

Still referring to FIG. 3, the connection from the main servomotor 12 to the feedback resolver 80 is seen to be a continuous shaft 38–39. If the angular position of the servomotor 12 is considered to be the input, and the angular position of the feedback resolver of rotor 84 is considered to be the output, the transmission of signals from input to output can be easily accomplished from zero frequency to a very high frequency.

But, if the angular position of the servomotor 12 is considered to be the input and the linear position of the column 10 is considered to be the output, the transmission of signals through the feed drive 14 from the input to output can properly be accomplished, i.e., without exceeding a predetermined distortion in amplitude and phase, only from zero frequency to some limit frequency.

The advantage of a limit on the correction rate of the correction feedback loop will now be evident. In the angular position of the servomotor 12 is considered to be the input, and the angle represented by the sine and cosine output signals from feedback resolver windings 84a, 84b are considered to be the output, the transmission of all signals from input to output from zero frequency to the limit frequency that can be properly transmitted by the feed drive 14 are desirably subject to correction by the correction feedback loop. The transmission of all signals from input to output that are above the limit frequency that can be properly transmitted by feed drive 14 are desirably not subject to correction by the correction feedback loop.

By selecting of the speed of response of the correction servo apparatus, control of the frequency at which the correction feedback loop cuts off can be obtained. The limit in correction rate which has been referred to previously is now seen to be a limit on the speed of response of the correction servo.

When such an arrangement is used, then the band-width of the main feedback loop is no longer limited to that band of frequencies which the feed drive can transmit without exceeding a predetermined distortion in amplitude and phase. This allows the gain of the main feedback loop to be greatly increased for small position error signals. When combined with the fact that the main feedback signals have also been accurately corrected for all motion frequencies from zero to the limit frequency of the feed drive, then the ability of the main servoloop to accurately drive the column 10 in response to the command signal has been greatly enhanced.

While the teachings of the invention have been set forth in conjunction with linear position control of a machine tool column 10, such is exemplary only, and the invention is applicable to rotary motions such as motions D and E of the machine shown in FIG. 2. In such cases, either a full 360° rotary Inductosyn or a partial or pie-shaped Inductosyn is usable for the correction servo apparatus transducer in place of the linear Inductosyn 50 as applied to linear position control of the column 10.

It will also be understood that the invention is applicable to tracer systems where the command signal of FIG. 3 is developed by a transducer stylus riding on a template.

The effect of band-width control may be particularly advantageously applied to a large vertical turning machine under the condition of a heavy interrupted cut. Under this type of cut, the repeated appearance and disappearance of the cutting force on the cutting tool can cause the feed drive to undergo a periodic stress and relief. Such periodic stress can cause a periodic deflection and return, which the main feedback loop would normally attempt to correct. Under such conditions, however, it may be more desirable to allow the normal deflection and return. In such event, one solution is to provide, according to this invention, a main feedback resolver on the driven end of the feed lead screw, and an Inductosyn scale arranged in a correction feedback loop.

An important advantage of this invention is the ability of the correction feedback loop to provide accurate feedback in spite of accumulations of pitch error over large numbers of rack teeth, for example, or accumulations of lead error when a nut is driven down a long lead screw. Under the condition of a long movement being made by column 10, for example, any accumulated pitch errors due to unavoidable manufacturing errors in producing the feed drive rack gear are corrected out by the correction servo virtually as fast as the error is being accumulated by the movement of column 10.

Another important advantage of this invention is the ability of the correction servo apparatus to provide accurate feedback up the very instant that the correction servomotor is intentionally turned off, either by a manually operated switch or by an auxiliary function command from the numerical control equipment. The correction feedback loop would in usual operation be turned on so that the main feedback is always automatically corrected. At the start of the interrupted cut, such an auxiliary function command may be used to disable the correction servomotor, allowing it to retain its last position. With such an arrangement during the interrupted cut, the feedback would be taken exclusively from the driven end of the feed lead screw; consequently, as the repeated deflection and returns occurred, these would not be reflected into the feedback and thus the main servomotor would take no correcting action. At the conclusion of the interrupted cut, another auxiliary function command may be used to turn the correction servomotor back on again.

I claim as my invention:

1. In a control system for positioning a movable element along a path responsive to a continuously supplied command signal, a servomotor for continuously moving said element along said path in accord with said command signal, feed drive means coupling said servomotor to said element, a main feedback loop including a feedback transducer operated responsive to motion of a drive element at the input to said feed drive dynamically spaced from said movable element and closely coupled to said servomotor so as to exclude said drive means from said main feedback loop providing a feedback signal, means in said main feedback loop for combining said command and feedback signals and for providing an output signal to said servomotor for driving said servomotor in a direction tending to eliminate said feedback signal and at a rate proportional to the magnitude of said output signal, means compensating said feedback transducer for position differences between said movable element and said drive element at the input to said feed drive means due to mechanical characteristics of said feed drive means including a second transducer operated responsive to said movable element, means for exciting said secondary transducer with said feedback signal from said feedback transducer to produce a continuous error signal from said second transducer representing the motion differences between said elements, and means connecting said second transducer to said feedback transducer so as to modify said feedback signal to account for said error signal.

2. In a control system for positioning a movable element along a path responsive to a command signal phase shifted relative to a reference signal to represent commanded direction and rate of movement, said system having a servomotor for continuously moving said element along said path in accord with said command signal, feed drive means coupling said servomotor to said element, a feedback transducer operated responsive to motion of a drive element at the input to said feed drive dynamically spaced from said movable element and closely coupled to said servomotor, means exciting said feedback transducer with a signal in phase with said reference signal, said transducer providing a phase shifted motion indicating feedback signal, means for combining said feedback and command signals so as to provide an error signal for driving said servomotor, means for operating said servomotor at a controlled rate proportional to said error signal so that said error signal is brought to zero, means connected electrically to said feedback transducer and responsive to said phase shifted feedback signal for providing a difference signal representing the motion differences between said feed drive element and said movable element, servo means for adjusting the phase of the electrical reference signal supplied to said feedback transducer, and means for operating said servo means at a controlled rate proportional to said difference signal so that said difference signal is brought to zero.

3. In a control system for moving a machine element along a path responsive to a continuously supplied command signal, a servomotor for continuously moving said element along said path in accord with said command signal, feed drive means coupling said servomotor to said machine element, a main feedback loop including a feedback transducer having a mechanical input responsive to motion of a drive element at the input to said feed drive means dynamically spaced from said machine element and closely coupled to said servomotor so as to exclude said feed drive means from said main feedback loop, said feedback transducer further having an electrical reference signal input and providing a feedback signal representing the motion of said drive element relative to said reference signal input, means for combining said feedback and command signals so as to provide an error signal for driving said servomotor in a direction tending to eliminate said error signal and at a rate proportional to the magnitude of said error signal, and means for adjusting said electrical reference signal input to said feedback transducer to account for inaccuracies in moving said machine element by said feed drive means including a second transducer excited by said feedback signal and operated responsive to the actual motion of said machine element for providing a signal representing the difference between the motions of said drive element and the input to said feed drive means and said machine element.

4. In a control system for moving a machine element along a path responsive to a continuously supplied command signal, a servomotor for continuously moving said element along said path in accord with said command signal, feed drive means coupling said servomotor to said machine element, a main feedback loop including a feedback transducer having a mechanical input responsive to motion of a drive element at the input to said feed drive means dynamically spaced from said machine element and closely coupled to said servomotor so as to exclude said feed drive means from said main feedback loop, said feedback transducer further having an electrical reference signal input and providing a feedback signal representing the motion of said drive element relative to said reference signal input, means for combining said feedback and command signals so as to provide an error signal for driving said servomotor in a direction tending to eliminate said error signal and at a rate proportional to the magnitude of said error signal, means for adjusting said electrical reference signal input to said feedback transducer to account for inaccuracies in moving said machine element by said feed drive means including a second transducer operated responsive to the actual motion of said machine element and to the feedback signal produced by said feedback transducer for providing a signal representing the difference between the motions of said drive element and the input to said feed drive means and said machine element, a correction servomotor means operated by said second transducer, and differential means between said correction servomotor and said feedback transducer.

5. In a control system for moving a machine element along a path responsive to a continuously supplied command signal, a servomotor for continuously moving said element along said path in accord with said command signal, feed drive means coupling said servomotor to said machine element, a main feedback loop including a rotary feedback resolver operated by a member at the input to said feed drive means dynamically spaced from said machine element and closely coupled to said servomotor so as to exclude said feed drive means from said main feedback loop, said resolver providing a feedback signal, means in said main feedback loop for combining said feedback and command signals so as to provide an error signal for driving said servomotor in a direction tending to eliminate said error signal and at a rate proportional to the magnitude of said error signal, a correction feedback loop having a linear resolver electrically connected to and excited from said rotary resolver and operated by the actual motion of said machine element so as to provide a correction feedback signal representing the difference between the motions of said member and said machine element, servo means actuated in response to said correction signal, and a differential resolver electrically connnected to said rotary resolver and operated by said servo means for compensating the feedback signal from said rotary resolver for inaccuracies in said feed drive means.

6. In a servo positioning control system for controlling the movement of a machine element along an axis in response to command signals and having a main servomotor and a mechanical drive connecting said main servomotor and said machine element and capable of transmitting without exceeding a predetermined distortion in amplitude and phase a pass-band of mechanical motion frequencies below a limit frequency, the combination comprising a main servomotor control circuit including a main feedback circuit having a main transducer for producing feedback signals in response to an electrical input signal and a mechanical input from a mechanical drive element closely coupled to said main servomotor to exclude said mechanical drive from said main feedback circuit, and also including circuit means for producing position error signals in response to said feedback signals and to command signals designating desired displacement of said machine element from any first position to any second position within substantially its entire range of movement along said axis and for applying said position error signals to said main servomotor; and apparatus for correcting said main feedback signals to compensate for inaccuracies of said following portion of said mechanical drive including a correction feedback circuit operative with said main feedback circuit at all velocities of movement and over the entire range of movement of said machine element along said axis and having second transducer means operatively connected to both said machine element and said drive element so as to produce difference signals representing the difference between the position of the machine element as measured by said second transducer means and the position of said drive element as measured by said main transducer, a correction servomotor operated responsive to said difference signals and having means for limiting its response to difference signals representing mechanical motion frequencies below substantially said limit frequency, the effective operation of said correction feedback circuit thereby matching the limited pass-band characteristics of the mechanical drive by responding to mechanical motion frequencies below the limit frequency and by not responding to mechanical motion frequencies above the limit frequency transmitted by the drive which if transmitted to the main feedback circuit tend to produce unstable operation of the main servomotor, and a device operated by said correction servomotor and operatively connected to said main feedback transducer to correct the feedback signals therefrom in accordance with the effective operation of said correction servomotor; said main servomotor being operable responsive to position error signals representing mechanical motion frequencies of said drive element both below and above said limit frequency so that the effective band-width of the main control circuit is widened beyond the pass-band of the mechanical drive and said machine element is accurately positioned in accordance with command signals within the wider band-width notwithstanding dynamic limitations, inaccuracies, and limited pass-band characteristics of the mechanical drive.

7. The combination in a servo positioning control system according to claim 6 in which said mechanical drive element comprises a shaft, and in which an electrical rotary resolver is operatively driven by said shaft so as to produce signals representing the angular positions of said shaft, and said second transducer comprises an electrical linear resolver mechanically connected to said machine element and electrically connected to receive said signals from said rotary resolver so as to produce difference signals representing the differences between the positions of said shaft and said machine element due to inaccuracies of said following portion of said mechanical drive.

8. The combination in a servo positioning control system according to claim 7 in which said device operated by said correction servomotor comprises means for shifting the phase of the electrical input signal to said main feedback transducer thereby to correct the feedback signals from said main feedback transducer to compensate for said inaccuracies.

9. The combination in a servo positioning control system according to claim 6 in which said drive element comprises a shaft connected to said main servomotor, said main feedback transducer comprises an electrical rotary resolver having a mechanical input from said shaft and reference windings for receiving an electrical reference signal input and feedback windings for producing said main feedback signals, and in which said apparatus for correcting said main feedback signals to compensate for inaccuracies of said following portion of said mechanical drive includes an electrical rotary resolver having a mechanical input from said correction servomotor and two sets of windings, one of said sets of windings being connected to receive a reference signal input, and the other of said sets of windings being effective to produce a reference signal corrected for said drive inaccuracies by the input from said correction servomotor, and a connection for conveying said corrected reference signal to said main feedback resolver reference windings.

10. The combination in a servo positioning control system according to claim 7 further including a manually adjustable electrical resolver connected to adjust the feedback signals from said main feedback transducer and supplied to said circuit means thereby to permit manually directed adjustment of the position of said machine element through said control system.

11. The combination in a servo positioning control system according to claim 10 further including readout means operated responsive to the corrected feedback signals from said main feedback transducer for producing a visual representation of the actual position of said machine element, the position of said machine element being determined both by the command signals and the manually directed adjustment.

12. The combination in a servo positioning control system according to claim 10 further including an electrical resolver having relatively movable sets of windings including one set of windings connected to be energized by the corrected feedback signals from said main feedback transducer, and a second set of windings in which a position signal is induced in response to the energization of said first set of windings, and readout means operated responsive to said induced position signal including a servomotor for relatively moving said sets of windings in a direction tending to reduce said induced signal to zero and thereby in synchronism with the actual movement of said machine element, and a readout drive operated by said servomotor for producing a visual representation of the actual position of said machine element, the position of said machine element being determined both by the command signals and the manually directed adjustment.

13. The combination in a servo positioning control system according to claim 6 in which said device operated by said correction servomotor comprises a differential gear connected to said drive element for correcting the mechanical input to said main feedback transducer thereby to correct the feedback signals from said main feedback transducer.

References Cited
UNITED STATES PATENTS

| | | | |
|---|---|---|---|
| 2,867,759 | 1/1959 | Comstock | 318—19 |
| 2,913,648 | 11/1959 | Brouwer | 318—28 |
| 3,209,223 | 9/1965 | Scheib | 318—30 |

BENJAMIN DOBECK, *Primary Examiner.*